(12) United States Patent
Dishon

(10) Patent No.: US 11,324,307 B2
(45) Date of Patent: May 10, 2022

(54) PRESSURE SENSING SYSTEM AND METHOD FOR AN ELECTRIC TOOTHBRUSH

(71) Applicant: Ranir, LLC, Grand Rapids, MI (US)

(72) Inventor: Bryan J. Dishon, Alto, MI (US)

(73) Assignee: Ranir, LLC, Grand Rapids, MI (US)

( * ) Notice: Subject to any disclaimer, the term of this patent is extended or adjusted under 35 U.S.C. 154(b) by 259 days.

(21) Appl. No.: 16/527,173

(22) Filed: Jul. 31, 2019

(65) Prior Publication Data
US 2020/0037749 A1 Feb. 6, 2020

Related U.S. Application Data

(60) Provisional application No. 62/713,720, filed on Aug. 2, 2018.

(51) Int. Cl.
*A46B 15/00* (2006.01)
*A61C 17/34* (2006.01)
*A61C 17/22* (2006.01)

(52) U.S. Cl.
CPC ........ *A46B 15/0012* (2013.01); *A61C 17/221* (2013.01); *A61C 17/34* (2013.01); *A46B 15/004* (2013.01); *A46B 15/0044* (2013.01); *A46B 15/0046* (2013.01); *A46B 2200/1066* (2013.01)

(58) Field of Classification Search
CPC ... A46B 15/0012; A46B 15/004; A61C 17/34; A61C 17/3409; A61C 17/3418; A61C 17/3436; A61C 17/221
See application file for complete search history.

(56) References Cited

U.S. PATENT DOCUMENTS

| | | | |
|---|---|---|---|
| 6,064,425 A | 5/2000 | Kevehazi | |
| 6,199,239 B1 | 3/2001 | Dickerson | |
| 6,327,734 B1 | 12/2001 | Meginniss, III et al. | |
| 6,389,636 B1 | 5/2002 | Savill | |
| 6,412,137 B1 | 7/2002 | Heidari | |
| 6,502,272 B1 | 1/2003 | Fox et al. | |
| 6,536,068 B1 | 3/2003 | Yang et al. | |
| 6,606,755 B1 | 8/2003 | Robinson et al. | |

(Continued)

FOREIGN PATENT DOCUMENTS

| CN | 104619212 A | 5/2015 |
|---|---|---|
| CN | 105101907 A | 11/2015 |

(Continued)

*Primary Examiner* — Laura C Guidotti
(74) *Attorney, Agent, or Firm* — Warner Norcross + Judd LLP

(57) ABSTRACT

A pressure feedback system continuously monitors the level of pressure or force on a brush head and is programmed to provide a feedback signal to a user based on the amount of pressure. The pressure level is monitored as a function of the change in the speed of the drive shaft. The system includes a housing, a motor, a drive shaft for attachment to a brush head, a feedback device, a sensor capable of detecting a change in the rotational speed of the drive shaft, and a microprocessor. The microprocessor is programmed activate the feedback device as a function of the measured change in rotational speed. The sensor may be a Hall effect sensor, or another sensor that is responsive to a magnetic field. A magnet may be positioned on the drive shaft, or another portion of the system that moves as a function of the drive shaft.

13 Claims, 4 Drawing Sheets

(56) References Cited

U.S. PATENT DOCUMENTS

| | | |
|---|---|---|
| 6,611,780 B2 | 8/2003 | Lundell et al. |
| 6,754,928 B1 | 6/2004 | Rosen |
| 6,786,732 B2 | 9/2004 | Savill et al. |
| 6,954,961 B2 | 10/2005 | Ferber et al. |
| 7,120,960 B2 | 10/2006 | Hilscher et al. |
| 7,418,757 B2 | 9/2008 | Gatzemeyer et al. |
| 7,556,320 B2 | 7/2009 | Hafliger et al. |
| 7,596,827 B1 | 10/2009 | Puneet |
| 7,621,015 B2 | 11/2009 | Hilscher et al. |
| 7,661,172 B2 | 2/2010 | Hilscher et al. |
| 7,673,360 B2 | 3/2010 | Hilscher et al. |
| 7,682,153 B2 | 3/2010 | Hilfinger et al. |
| 7,748,069 B2 | 7/2010 | Dawley |
| 7,774,886 B2 | 8/2010 | Hilscher et al. |
| 7,845,041 B2 | 12/2010 | Gatzemeyer et al. |
| 7,979,939 B2 | 7/2011 | Hilscher et al. |
| 7,985,073 B2 | 7/2011 | Hilscher et al. |
| 8,137,109 B2 | 3/2012 | Gatzemeyer et al. |
| 8,181,301 B2 | 5/2012 | Hilscher et al. |
| 8,201,295 B2 | 6/2012 | Gatzemeyer et al. |
| 8,214,958 B2 | 7/2012 | Pinyayev et al. |
| 8,225,449 B2 | 7/2012 | Gatzemeyer et al. |
| 8,272,091 B2 | 9/2012 | Hwang et al. |
| 8,397,332 B2 * | 3/2013 | Kraus ............... A61C 17/3454 15/22.1 |
| 8,413,286 B2 | 4/2013 | Nanda |
| 8,443,476 B2 | 5/2013 | Hilscher et al. |
| 8,479,341 B2 | 7/2013 | Iwahori |
| 8,484,793 B2 | 7/2013 | Nanda |
| 8,491,210 B2 | 7/2013 | Jimenez et al. |
| 8,512,040 B2 | 8/2013 | Binner et al. |
| 8,533,891 B2 | 9/2013 | Waguespack |
| 8,533,892 B2 | 9/2013 | Dabrowski |
| 8,544,131 B2 | 10/2013 | Braun et al. |
| 8,544,132 B2 | 10/2013 | Gatzemeyer et al. |
| 8,683,637 B2 | 4/2014 | Hilscher et al. |
| 8,702,422 B2 | 4/2014 | Binner et al. |
| 8,758,022 B2 | 6/2014 | Kim |
| 8,763,189 B2 | 7/2014 | Jungnickel et al. |
| 8,766,568 B2 | 7/2014 | Benning et al. |
| 8,769,753 B2 | 7/2014 | Fraser |
| 8,789,227 B2 | 7/2014 | Cook et al. |
| 8,832,895 B2 | 9/2014 | Jungnickel et al. |
| 8,898,843 B2 | 12/2014 | Okazaki |
| 8,904,590 B2 | 12/2014 | Jungnickel |
| 8,918,940 B2 | 12/2014 | Gatzemeyer et al. |
| 8,920,340 B2 | 12/2014 | Gittins et al. |
| 8,943,635 B2 | 2/2015 | Heil et al. |
| 8,966,696 B2 | 3/2015 | Hall |
| 8,984,699 B2 | 3/2015 | Russell et al. |
| 8,997,301 B2 | 4/2015 | Wong et al. |
| 9,009,901 B2 | 4/2015 | Doll et al. |
| 9,038,226 B1 | 5/2015 | Franklin |
| 9,044,083 B2 | 6/2015 | Nanda |
| 9,049,920 B2 | 6/2015 | De Vries et al. |
| 9,060,596 B2 | 6/2015 | Nanda |
| 9,066,581 B2 | 6/2015 | Hohlbein et al. |
| 9,072,370 B2 | 7/2015 | Gatzemeyer et al. |
| 9,089,390 B2 | 7/2015 | Klemm et al. |
| 9,105,197 B2 | 8/2015 | Meriheinae et al. |
| 9,113,700 B2 | 8/2015 | Bates et al. |
| 9,138,046 B2 | 9/2015 | Jimenez et al. |
| 9,144,476 B2 | 9/2015 | Iwahori et al. |
| 9,192,762 B2 | 11/2015 | Doll et al. |
| 9,198,502 B2 | 12/2015 | Bames et al. |
| 9,204,947 B2 | 12/2015 | Bovenkamp et al. |
| 9,223,903 B2 | 12/2015 | Lamb et al. |
| 9,259,302 B2 | 2/2016 | Miller |
| 9,289,055 B2 | 3/2016 | Slocum et al. |
| 9,345,408 B2 | 5/2016 | Curry et al. |
| 9,326,594 B2 | 8/2016 | Bates et al. |
| 9,408,681 B2 | 8/2016 | Bates et al. |
| 9,427,078 B2 | 8/2016 | Farrell et al. |
| 9,427,294 B2 | 8/2016 | Klemm et al. |
| 9,439,503 B2 | 9/2016 | Bames et al. |
| 9,445,877 B2 | 9/2016 | Wong et al. |
| 9,457,199 B2 | 10/2016 | Lin |
| 9,462,878 B1 | 10/2016 | Filo et al. |
| 9,498,053 B2 | 11/2016 | Patel |
| 9,498,312 B2 | 11/2016 | Dykes et al. |
| 9,517,015 B2 | 12/2016 | Deane et al. |
| 9,521,899 B1 | 12/2016 | Tai |
| 9,552,743 B2 | 1/2017 | Meriheinae et al. |
| 9,565,927 B2 | 2/2017 | Bloch et al. |
| 9,572,419 B2 | 2/2017 | Bloch et al. |
| 9,578,957 B2 | 2/2017 | Patel et al. |
| 9,642,684 B2 | 5/2017 | Yoshida et al. |
| 9,648,945 B2 | 5/2017 | Cook et al. |
| 9,700,128 B2 | 7/2017 | Kennedy et al. |
| 9,700,211 B2 | 7/2017 | Simons et al. |
| 9,711,063 B2 | 7/2017 | Penake et al. |
| 9,723,913 B2 | 8/2017 | Jimenez et al. |
| 9,724,001 B2 | 8/2017 | Dykes et al. |
| 9,724,179 B2 | 8/2017 | Simeth et al. |
| 9,744,012 B2 | 8/2017 | Sayles et al. |
| 9,750,586 B2 | 9/2017 | Hwang et al. |
| 9,811,636 B2 | 11/2017 | Dykes et al. |
| 9,814,427 B2 | 11/2017 | Keating et al. |
| 9,827,078 B2 | 11/2017 | Bock |
| 9,839,501 B2 | 12/2017 | Kandemir |
| 9,844,260 B2 | 12/2017 | Sayles |
| 9,848,776 B2 | 12/2017 | Proud |
| 9,848,968 B2 | 12/2017 | Jungnickel et al. |
| 9,861,459 B2 | 1/2018 | Addington |
| 9,901,430 B2 | 2/2018 | Boughorbel |
| 9,918,815 B1 | 3/2018 | Ho et al. |
| 9,936,795 B2 | 4/2018 | Moskovich et al. |
| 10,004,324 B2 | 6/2018 | Nanda |
| 10,010,250 B2 | 7/2018 | Vermeulen et al. |
| 10,034,730 B2 * | 7/2018 | Skaanland ......... A46B 15/0038 |
| 2015/0044629 A1 | 2/2015 | Wang et al. |
| 2015/0230593 A1 | 8/2015 | Doll et al. |
| 2015/0230898 A1 | 8/2015 | Miller |
| 2015/0230899 A1 | 8/2015 | Vetter et al. |
| 2015/0257863 A1 | 9/2015 | Gatzemeyer et al. |
| 2016/0015492 A1 | 1/2016 | Skaanland et al. |
| 2016/0037903 A1 | 2/2016 | Lal |
| 2016/0038033 A1 | 2/2016 | Lal |
| 2016/0081778 A1 | 3/2016 | Hwang et al. |
| 2016/0143718 A1 | 5/2016 | Serval et al. |
| 2016/0174699 A1 | 6/2016 | Doll et al. |
| 2016/0220013 A1 | 8/2016 | Barnes et al. |
| 2016/0286949 A1 | 10/2016 | Nguyen et al. |
| 2016/0287363 A1 | 10/2016 | Miller |
| 2016/0296161 A1 | 10/2016 | Waller |
| 2016/0296163 A1 | 10/2016 | Chaudhry et al. |
| 2016/0310248 A1 | 10/2016 | Meerbeek et al. |
| 2016/0317267 A1 | 11/2016 | Meerbeek et al. |
| 2016/0338807 A1 | 11/2016 | Bloch et al. |
| 2016/0338808 A1 | 11/2016 | Bloch et al. |
| 2017/0020277 A1 | 1/2017 | Barnes et al. |
| 2017/0065386 A1 | 3/2017 | Farrell et al. |
| 2017/0112272 A1 | 4/2017 | Bloch et al. |
| 2017/0112273 A1 | 4/2017 | Bloch et al. |
| 2017/0135464 A1 | 5/2017 | Knickerbocker et al. |
| 2017/0143957 A1 | 5/2017 | Johansson et al. |
| 2017/0188836 A1 | 7/2017 | Xi et al. |
| 2017/0189153 A1 | 7/2017 | Johansson et al. |
| 2017/0238863 A1 | 8/2017 | Kimmel |
| 2017/0263149 A1 | 9/2017 | Sullivan |
| 2017/0303673 A1 | 10/2017 | Van Gool et al. |
| 2017/0312062 A1 | 11/2017 | Johnson et al. |
| 2017/0318954 A1 | 11/2017 | Nishiura et al. |
| 2017/0319311 A1 | 11/2017 | Luettgen et al. |
| 2017/0333172 A1 | 11/2017 | Zheng |
| 2017/0360538 A1 | 12/2017 | Luo et al. |
| 2017/0360539 A1 | 12/2017 | Luo et al. |
| 2018/0020819 A1 | 1/2018 | Steckling |
| 2018/0024507 A1 | 1/2018 | Godlieb |
| 2018/0064238 A1 | 3/2018 | Cook et al. |
| 2018/0098620 A1 | 4/2018 | Lee et al. |
| 2018/0103747 A1 | 4/2018 | Lavezzo et al. |
| 2018/0125224 A1 | 5/2018 | Peng et al. |
| 2018/0132602 A1 | 5/2018 | Gatzemeyer |

(56) References Cited

U.S. PATENT DOCUMENTS

| | | |
|---|---|---|
| 2018/0132603 A1 | 5/2018 | Gatzemeyer et al. |
| 2018/0132604 A1 | 5/2018 | Gatzemeyer et al. |
| 2018/0137774 A1 | 5/2018 | Gatzemeyer |
| 2018/0153298 A1 | 6/2018 | Talbert |
| 2018/0177489 A1 | 6/2018 | Yu et al. |
| 2018/0177575 A1 | 6/2018 | Yoshida et al. |
| 2018/0192765 A1 | 7/2018 | Jeanne et al. |
| 2018/0193122 A1 | 7/2018 | Yoshida et al. |

FOREIGN PATENT DOCUMENTS

| | | |
|---|---|---|
| CN | 111356416 A | 6/2020 |
| WO | 2016174621 | 11/2016 |
| WO | 2016180929 | 11/2016 |
| WO | 2016181254 | 11/2016 |
| WO | 2016181255 | 11/2016 |
| WO | 2016184395 | 11/2016 |
| WO | 2016201063 | 12/2016 |
| WO | 2016205055 | 12/2016 |
| WO | 2017002004 | 1/2017 |
| WO | 2017002038 | 1/2017 |
| WO | 2017017541 | 2/2017 |
| WO | 2017029469 | 2/2017 |
| WO | 2017070158 | 4/2017 |
| WO | 2017102859 | 6/2017 |
| WO | 2017109633 | 6/2017 |
| WO | 2017115200 | 7/2017 |
| WO | 2017116971 | 7/2017 |
| WO | 2017117120 | 7/2017 |
| WO | 2017129509 | 8/2017 |
| WO | 2017139256 | 8/2017 |
| WO | 2017145033 | 8/2017 |
| WO | 2017160811 | 9/2017 |
| WO | 2018037318 | 3/2018 |
| WO | 2018065372 | 4/2018 |
| WO | 2018065373 | 4/2018 |
| WO | 2018065374 | 4/2018 |
| WO | 2018075021 | 4/2018 |
| WO | 2018087113 | 5/2018 |
| WO | 2018087627 | 5/2018 |
| WO | 2018089886 | 5/2018 |
| WO | 2018089888 | 5/2018 |
| WO | 2018099770 | 6/2018 |
| WO | 2018100121 | 6/2018 |
| WO | 2018100198 | 6/2018 |

\* cited by examiner

PRESSURE SENSING SYSTEM AND METHOD FOR AN ELECTRIC TOOTHBRUSH

BACKGROUND OF THE INVENTION

It is known to provide one or more sensing mechanisms in power and manual toothbrushes to determine the pressure applied to the bristle field during brushing. Typically, a sensor of some kind measures the force applied to the bristles. In some cases, the sensor includes a spring, a moment arm and a switch in which the force applied to the bristle field produces an action on the spring, which in turn drives a moment arm. When the force reaches a threshold or trigger value, a switch is operated, which sends a signal to the user that the force applied has exceeded the threshold level. The user then has the opportunity to reduce the pressure to an acceptable level.

These systems can also be used to ensure that at least a minimum amount of pressure is applied by the user to the bristle field as well. Pressure-sensing systems, however, are often difficult to implement in a typical power or manual toothbrush. Such systems can also add significantly to the overall cost of the toothbrush and often suffer from inaccuracy.

Typically, in such pressure-sensing system, there is no continuous monitoring of pressure information but only an indication of when the applied pressure has reached the threshold value indicative of excessive pressure. A need exists for a compact, simple and inexpensive sensor system for a toothbrush, particularly one which provides continuous monitoring of pressure such that it can be tailored to provide a desired feedback.

SUMMARY OF THE INVENTION

The present invention provides a pressure feedback system for a brush head that continuously monitors the level of pressure or force on the brush head and is programmed to provide a feedback signal to a user based on the amount of pressure.

In one embodiment, the system monitors the pressure level on the brush head as a function of a change in the speed of the drive shaft extending from the motor. The system includes a housing, a motor within the housing, a drive shaft connected to the motor and having a portion extending from the housing for attachment to a brush head, a feedback device, a sensor capable of detecting a change in the rotational speed of the drive shaft; and a microprocessor connected to the sensor and the feedback device, the microprocessor programmed to send a signal to activate the feedback device as a function of the change in rotational speed of the drive shaft detected by the sensor.

In one embodiment, the system includes a magnet that moves in a repeating or oscillating manner as a function of the movement of the drive shaft, and a sensor that generates a signal based on the movement of the magnet. The sensor may be a Hall effect sensor, or another sensor that is responsive to a magnetic field. The magnet may be positioned on the drive shaft, or another portion of the system that moves as a function of the drive shaft.

The drive shaft is connected to the motor and provides movement to the system. In one embodiment, the drive shaft is a rotational drive shaft and in a more particular embodiment, the drive shaft oscillates about an axis of rotation. The rotary oscillating movement may be provided by a cam or gear mechanism within the housing that is arranged between the motor and the drive shaft.

The microprocessor may be programmed to activate the feedback device to provide an alert to the user at a predetermined threshold. In one embodiment, the threshold is based on a measured change in the rotational speed of the drive shaft or other movable portion. For example, the drive shaft may operate at a first rotational speed when no load is applied to the brush head, and a second rotational speed when the brush head is in use and a force is applied to the brush head or bristle carrier. The microprocessor may be programmed to signal the feedback device when the change in speed between the first rotational speed and the second rotational speed exceeds a predetermined threshold. In one embodiment, the threshold is between about 5000 and 7000 RPM and in another embodiment, the threshold is about 6000 RPM. In one embodiment, the system continuously monitors the change in rotational speed from the first rotational speed as the brush head is in operation, and signals the feedback device to activate during those periods where the threshold has been exceeded and to deactivate during those periods where the threshold is not met.

In one embodiment, the feedback device is positioned on the housing. In another embodiment, the feedback device is at least one of a light emitting device, an audible device and a haptic device.

The brush head may include a neck having a first end connected to a portion of the housing and a second end supporting a bristle carrier, the brush head may include a brush shaft that is driven to rotate about a first axis by the drive shaft, the bristle carrier being driven to rotate about a second axis by the brush shaft.

Figure 1:
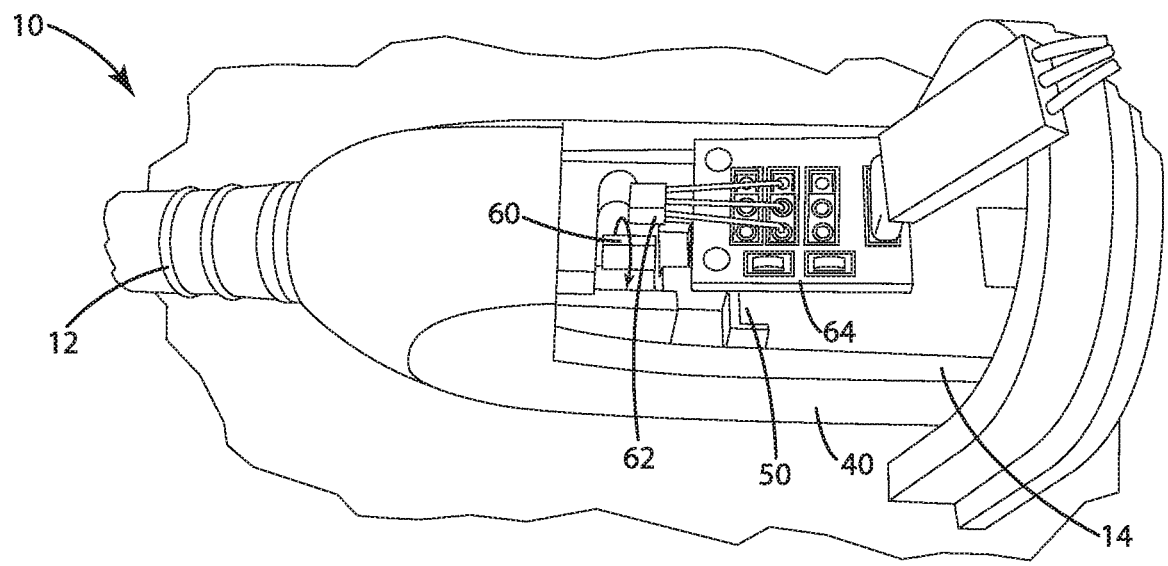
FIG. 1 is a partial top perspective view picture according to an embodiment of the invention with a magnet in a first position.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DESCRIPTION OF THE CURRENT EMBODIMENTS

The embodiments of the invention described herein relate to an electric toothbrush 10, which includes a brush head 12 that may be secured to a drive unit 14. In one embodiment, the brush head 12 is a replacement head that may be plugged onto the drive unit 14. The brush head 12 includes a bristle carrier 18 that supports one or more cleaning elements 20. Actuation of the drive unit 14 causes oscillation of the bristle carrier 18 and cleaning elements 20.

Figure 6:
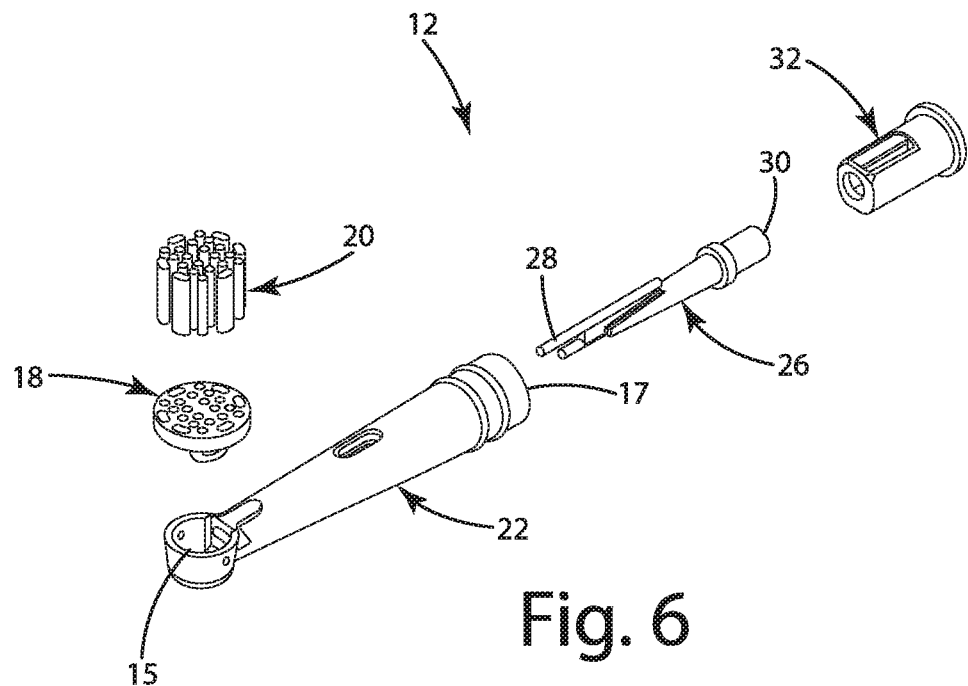
FIG. 6 is an exploded view of a brush head according to one embodiment.

In one embodiment, the brush head 12 includes a tubular neck 22 that supports the bristle carrier 18 at one end 15 and includes an open end 17 opposite the bristle carrier 18 for attachment to the drive unit 14. One example of the brush head 12 is shown in FIG. 6. As shown in FIG. 6, the brush head 12 includes the neck 22, bristle carrier 18 and bristles 20 supported on the bristle carrier 18. A brush shaft 26 extends within the tubular neck 22 and includes a first end 28 that engages the bristle carrier 18 and an opposite end 30 that engages a drive shaft extending from the drive unit 14. The brush shaft 26 extends along a longitudinal axis and is capable of rotation, and more specifically rotary oscillation, about the longitudinal axis. A portion of the brush shaft 26 may extend through an optional sleeve 32, which may be inserted into the open end 17 of the tubular neck 22 for removably mounting to the drive unit 14 via a snap fit or a friction fit.

A motion conversion mechanism between the brush shaft 26 and the bristle carrier 18 causes rotary oscillation of the bristle carrier 18 about a carrier axis that is transverse to the longitudinal axis of the brush shaft 26. One embodiment of a motion conversion mechanism according to the embodiment shown in FIG. 6 is described in U.S. Pat. No. 9,439,741 to Dishon, the subject matter of which is incorporated herein by reference. Another embodiment of a motion conversion mechanism including a bevel gear is disclosed in U.S. Pat. No. 6,021,538 to Kressner, the subject matter of which is also incorporated herein by reference.

Figure 7:
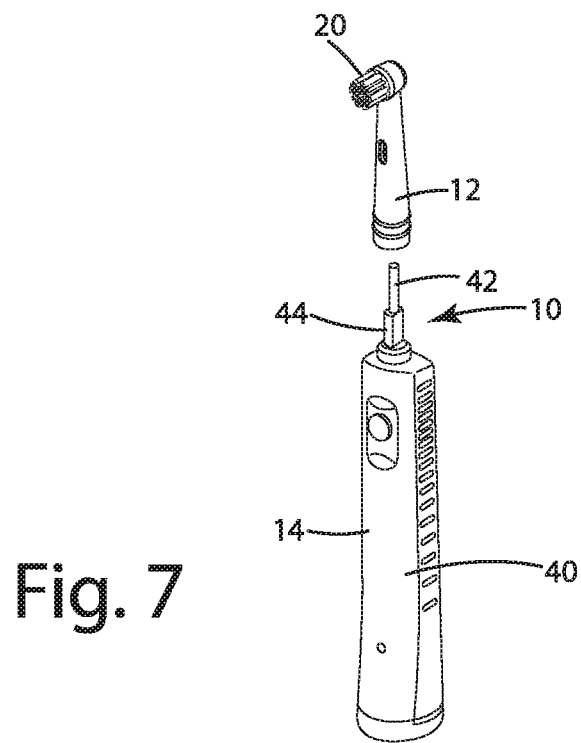
FIG. 7 is an exploded view of an exemplary brush head and drive unit.

Referring now to FIG. 7, the drive unit 14 includes a handle portion 40 and a drive shaft 42 extending from the handle portion 40. A mounting portion 44 of the drive unit 14 engages the sleeve 32 or another portion of the brush head 12 for attachment of the drive unit 14 to the brush head 12. When the brush head 12 is plugged onto the drive unit, the drive shaft 42 extends along the longitudinal axis defined by the brush shaft 26 and engages the end 30 of the brush shaft 26 such that rotation of the drive shaft 42 about the longitudinal axis causes rotation of the brush shaft 26 about the same axis.

The drive unit 14 includes an electric motor 50 that can be actuated to move the drive shaft 42. In one embodiment, the motor 50 is a DC motor that is powered by a battery. The motor 50 and battery may be positioned within the handle portion 40 of the drive unit 14 and operated by a switch on the exterior of the drive unit 14. A motor shaft extends from the motor 50 and can be driven to rotate by the motor 50. A gearing or cam arrangement converts the rotation of the motor shaft into rotary oscillating movement of the drive shaft 42.

FIGS. 1-4 illustrate the structure and operation of a system for sensing the amount of pressure applied to the bristles 20 and bristle carrier 18, and for providing feedback to the user upon the measured pressure reaching a predetermined threshold. In one embodiment, the system measures the change in rotational speed of the drive shaft 42 using a sensor capable of observing a magnetic field along with a magnet positioned on the drive shaft 42 or another movable portion of the drive unit 14 or brush head 12. In the illustrated embodiment, the system measures the change in rotational speed of the drive shaft 42 using a Hall effect sensor 62 and a magnet 60. In another embodiment the system may use a different sensor, such as a TMR (tunnel-magnetoresistance) sensor in a manner similar to the Hall effect sensor. The system determines the pressure on the bristles 24 and bristle carrier 18 as a function of the measured change in rotational speed.

FIG. 1 shows the electric toothbrush 10 with a portion of the handle 40 cut away to expose the interior components. As shown, a permanent magnet 60 is attached to the oscillating drive shaft 42. In an alternative embodiment, the magnet 60 can be attached to any other movable portion of the drive unit 14 that experiences a load applied by the user, including the rotating motor shaft or a portion of the gear or cam structure. A Hall effect sensor 62 is mounted adjacent to the drive shaft 42, wherein rotational oscillation of the drive shaft 42 repeatedly moves the magnet 60 in and out of proximity with the Hall effect sensor 62.

The Hall effect sensor 62 is connected to a microprocessor 64, which is operably connected to the battery and at least one feedback device capable of providing a signal to the user. The feedback device may be a visual feedback device such as an LED bulb or screen, an audible device such as a speaker, or a haptic device such as a motor pulse generator. In the illustrated embodiment (a prototype style embodiment), the microprocessor 64 includes a first microprocessor portion 66 and a second microprocessor portion 68. In a production version, the microprocessor 64 may be a single consolidated element.

Figure 2:
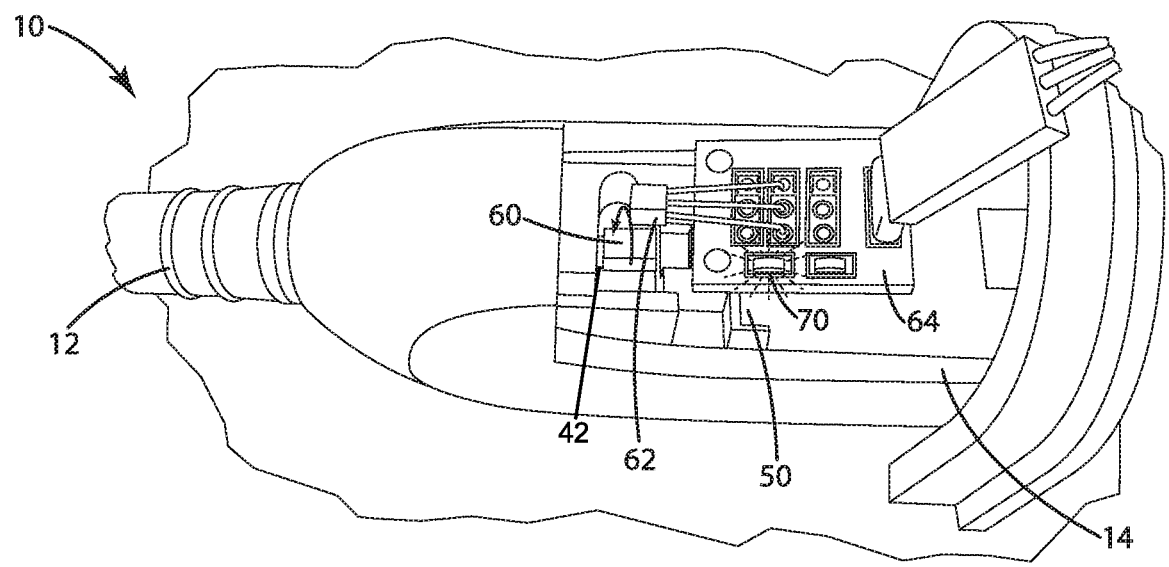
FIG. 2 is a partial top perspective view thereof with the magnet in a second position.

As illustrated, the pressure sensor system includes two LED bulbs that function as feedback devices. A first LED bulb 70 (included primarily for prototype purposes) lights when the magnet 60 is in proximity to the Hall effect sensor 62. As an example, FIG. 1 shows the permanent magnet 60 attached to the drive shaft 42 and rotated out of proximity from the Hall effect sensor. As a result, the first LED bulb 70 is off. FIG. 2 shows the permanent magnet 60 rotated in proximity to the Hall effect sensor. As a result, the first LED bulb 70 is on. Although not required in a commercial version of the system, the LED 70 provides an illustration of how the system continuously monitors the pressure on the brush head by actively observing movement and speed of the magnet and drive shaft.

Figure 3:
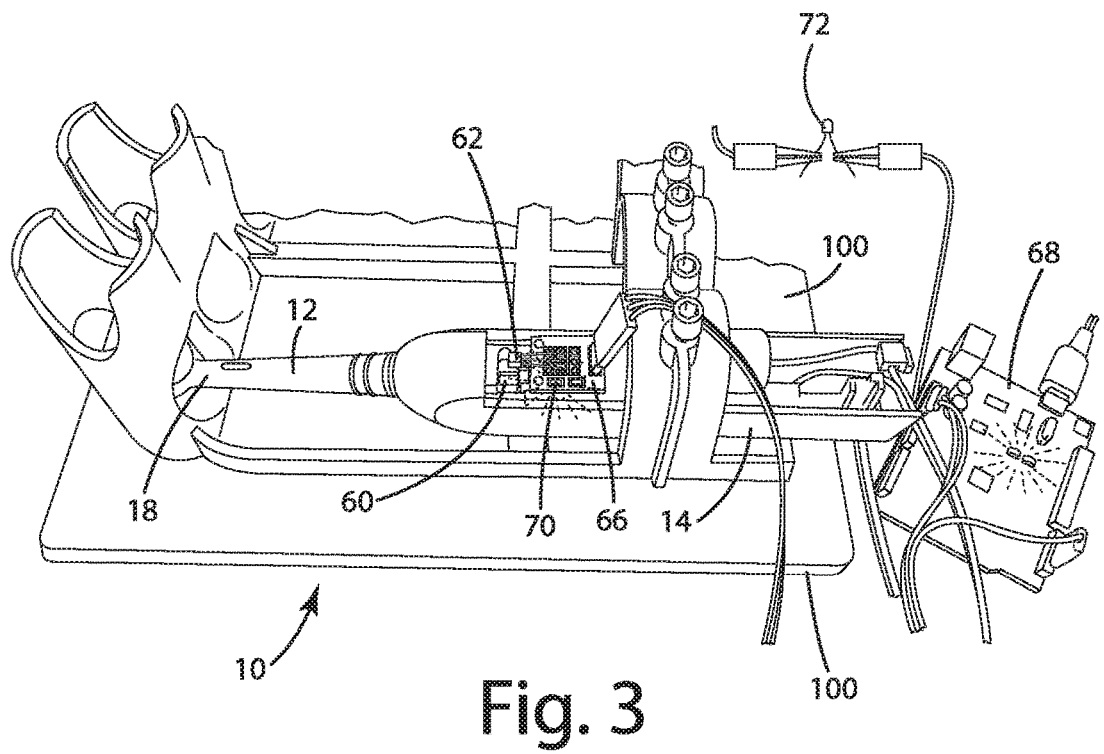
FIG. 3 is a perspective view according to an embodiment of the invention positioned in a test fixture.
Figure 4:
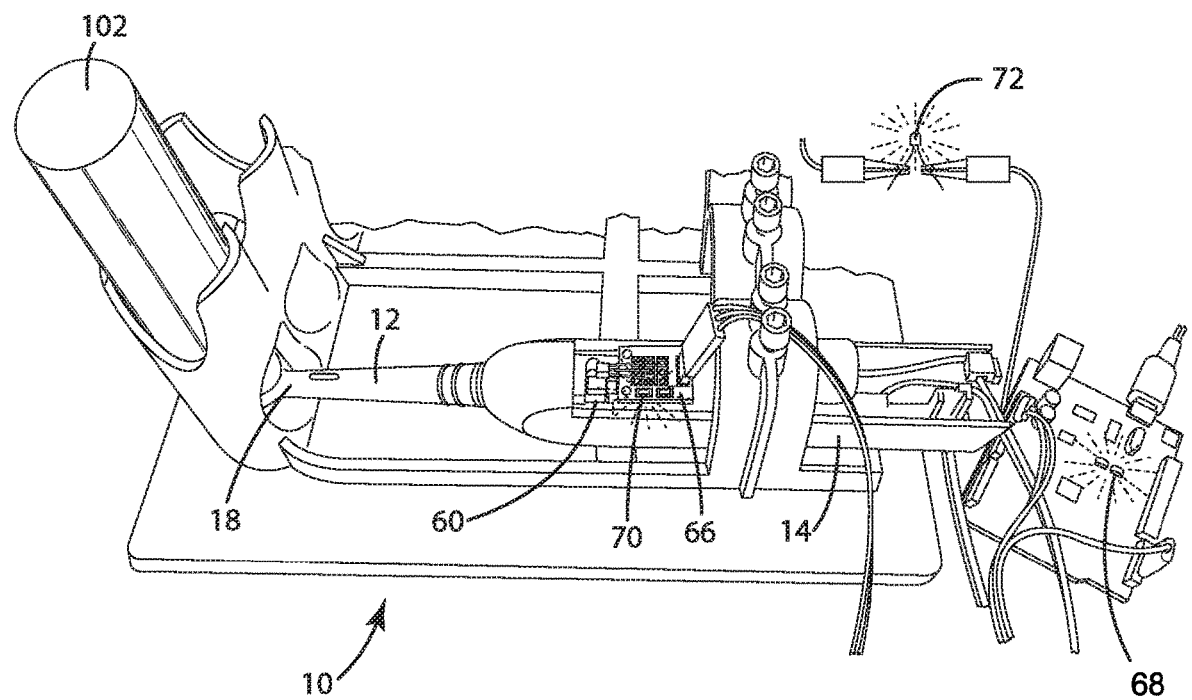
FIG. 4 is perspective view thereof with the brush head experiencing a high pressure condition.

FIGS. 3 and 4 show an electric toothbrush 10 according to a prototype embodiment of the invention wherein the prototype toothbrush 10 is positioned within a fixture 100 having a weight 102 capable of applying varying amounts of pressure to the brush head 12. FIGS. 3 and 4 further show a second LED bulb 72 that functions as a primary feedback device for the user. Although the second LED bulb 72 is shown wired externally to the electric toothbrush 10 in the prototype embodiment, a production version of the electric toothbrush 10 may include the second LED 72 positioned on the drive unit 14 in location that is visible to the user. In another embodiment, the second LED 72 may be any other type of feedback device, including a device that is wirelessly connected to the microprocessor 64 such as a mobile phone or watch.

In one embodiment, the second LED 72 (or an alternative feedback device) is activated when the pressure on the brush head 12 reaches a predetermined threshold level in order to alert the user that he/she is brushing with too much pressure. As noted above, during operation of the toothbrush 10, the Hall effect sensor 62 measures the proximity of the magnet. In one embodiment, the Hall effect sensor 62 is a digital sensor, such that the sensor 62 signals the microprocessor 64 only that the magnet 60 is proximate the sensor 62, and the sensor 62 does not signal the microprocessor 64 when the magnet 60 is not proximate the sensor 62. As the drive shaft 42 oscillates, the sensor 62 repeatedly signals.

The microprocessor 64 registers the rate at which the Hall effect sensor 62 signals, which is indicative of the rotational speed (RPM's) of the drive shaft 42, and is programmed with an algorithm to determine when an excessive or undesirable force is being exerted on the brush head 12. One generally accepted value for excessive brushing force is 300 g, and in one embodiment, the microprocessor is programmed to activate the feedback device (such as LED 72) when the microprocessor determines that a brushing pressure of 300 g has been reached or exceeded. In an alternative embodiment, another value for excessive brushing force may be used, and in yet another alternative embodiment, a threshold for minimum effective brushing pressure may be programmed in addition to, or instead of, the maximum brushing pressure.

Figure 5:
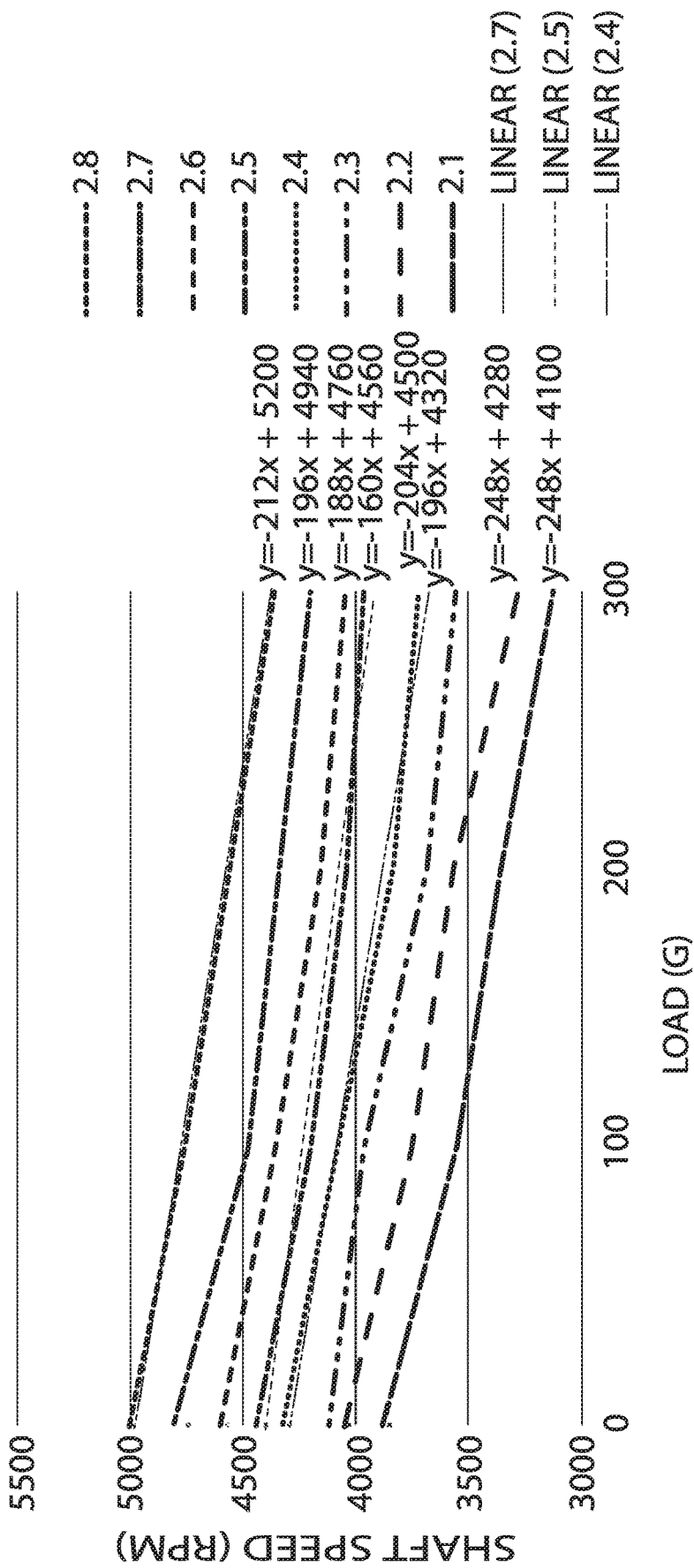
FIG. 5 is a graphical representation of test results using the text fixture.

Referring now to FIG. 5, in one embodiment the microprocessor 64 determines whether an excessive brushing pressure has been met as a function of the change in the rotational speed of the drive shaft 42 during operation. FIG. 5 shows the graphical results of testing the toothbrush 10 using the fixture shown in FIGS. 3 and 4 at different operating voltages. As can be seen, the resulting change in shaft speed is generally linear for operating voltages between 2.8V and 2.1V, regardless of the operating voltage. In each test case, a brushing force of 300 g drops the rotational speed of the drive shaft 42 by about 5000-7000 RPM. As a result, in one embodiment the microprocessor 64 is programmed to activate the LED 72 (or other feedback device) when the measured shaft speed changes by an amount in the range of about 5000-7000 RPM.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The embodiments of the invention in which an exclusive property or privilege is claimed are defined as follows:

1. A system for determining an amount of pressure applied to a brush head, and for providing feedback to a user upon a measured pressure reaching a predetermined threshold, the system comprising:
    a brush head;
    a drive unit connected to the brush head, the drive unit having a drive shaft that is activated to move the brush head with respect to the drive unit;
    a magnet that moves in a repeating manner as a function of the movement of the drive shaft;
    a Hall effect sensor that generates a signal based on the movement of the magnet;
    a feedback device; and
    a microprocessor connected to the Hall effect sensor and the feedback device, the microprocessor programmed to activate the feedback device as a function of a change in speed of the movement of the magnet;
    wherein the movement of the drive shaft is rotational
    wherein the movement of the drive shaft is rotary oscillating about an axis; and
    wherein the microprocessor generates a signal based on the change in rotational speed of the drive shaft.

2. The system of claim 1 wherein the microprocessor is programmed with a threshold change in rotational speed, such that the microprocessor generates a signal based on change in rotational speed meeting the predetermined threshold.

3. The system of claim 2 wherein the threshold is between about 5000 and 7000 RPM.

4. The system of claim 3 wherein the threshold is about 6000 RPM.

5. The system of claim 4 wherein the feedback device is one of a light emitting device, an audible device and a haptic device.

6. The system of claim 5 wherein the feedback device is positioned on the drive unit.

7. The system of claim 6 wherein the brush head includes a neck having a first end connected to the drive unit and a second end supporting a bristle carrier, the brush head including a brush shaft that is driven to rotate about a first axis by the drive shaft, the bristle carrier being driven to rotate about a second axis by the brush shaft.

8. A pressure feedback system for a brush head comprising:
    a brush head;
    a drive unit connected to the brush head, the drive unit having a drive shaft that is activated to oscillate the brush head with respect to the drive unit;
    a magnet that oscillates as a function of the movement of the drive shaft;
    a sensor that generates a signal based on the oscillation speed of the magnet;
    a feedback device; and
    a microprocessor connected to the sensor and the feedback device, the microprocessor programmed to activate the feedback device as a function of a change in speed of the movement of the magnet;
    wherein the movement of the drive shaft is rotational; and
    wherein the microprocessor is programmed with a threshold change in rotational speed of the drive shaft, such that the microprocessor activates the feedback device based on change in rotational speed meeting a predetermined threshold.

9. The pressure feedback system of claim 8 wherein the brush head includes a brush shaft and a bristle carrier, the brush shaft connected between the drive shaft and the bristle carrier.

10. The pressure feedback system of claim 8 wherein the magnet is connected to the drive shaft and the sensor is fixed in position with respect to the magnet.

11. The pressure feedback system of claim 8 wherein the threshold change is a change in speed between about 5000 and 7000 RPM.

12. A pressure feedback system for a brush head comprising:
   a housing;
   a motor within the housing;
   a drive shaft connected to the motor and having a portion extending from the housing for attachment to a brush head, the drive shaft operable to rotate at a rotational speed upon activation of the motor;
   a feedback device;
   a sensor capable of detecting a change in the rotational speed of the drive shaft; and
   a microprocessor connected to the sensor and the feedback device, the microprocessor programmed to send a signal to activate the feedback device as a function of the change in rotational speed of the drive shaft detected by the sensor;
   wherein the brush head includes a brush shaft connected to the drive shaft and a bristle carrier connected to the brush shaft, wherein rotation of the drive shaft causes rotation of the brush shaft and the bristle carrier; and
   wherein the sensor detects a change in rotational speed of the drive shaft resulting from a force on the bristle carrier.

13. The pressure feedback device of claim 12 wherein the microprocessor is programmed to send the signal to the feedback device upon a change in the rotational speed of the drive shaft exceeding a predetermined threshold.

* * * * *